United States Patent [19]

Carroll et al.

[11] 4,397,470

[45] Aug. 9, 1983

[54] OIL SLINGER AND METHOD OF MOUNTING

[75] Inventors: Alexander A. Carroll, Greensburg; William F. Hannan, III, Pittsburgh, both of Pa.

[73] Assignee: Elliott Turbomachinery Co., Inc., Jeannette, Pa.

[21] Appl. No.: 289,669

[22] Filed: Aug. 3, 1981

[51] Int. Cl.³ .................. E21B 33/00; B61F 15/22; B23D 11/02
[52] U.S. Cl. ................................ 277/1; 277/67; 29/451; 29/453
[58] Field of Search .............. 29/451, 453, 455; 239/223, 224; 184/11 R, 11 D, 13 R; 277/67, 68, 1

[56] References Cited

U.S. PATENT DOCUMENTS

| | | | |
|---|---|---|---|
| 2,929,663 | 3/1960 | Hoeltje | 308/187 |
| 3,379,443 | 4/1968 | Park et al. | 277/67 |
| 4,050,722 | 9/1977 | Berger et al. | 29/453 |
| 4,171,137 | 10/1979 | Aizu et al. | 277/67 |
| 4,308,044 | 12/1981 | Myer | 29/453 |
| 4,333,659 | 6/1982 | Gibbs | 277/67 |
| 4,337,563 | 7/1982 | Becker et al. | 29/451 |

Primary Examiner—Ervin M. Combs
Assistant Examiner—Steven E. Nichols
Attorney, Agent, or Firm—Donald F. Daley; David J. Zobkiw

[57] ABSTRACT

An oil slinger is held in place on a shaft by an O-ring which serves as a detent when the shaft is at rest and as a static seal when the shaft is rotating. Because the slinger is held only by a detent action in the rest position, the slinger can be moved aside during assembly and disassembly of the companion bearing and seal structure and thereby provide greater access.

4 Claims, 4 Drawing Figures

OIL SLINGER AND METHOD OF MOUNTING

BACKGROUND OF THE INVENTION

In some applications it is necessary to prevent the migration of oil along a rotating shaft either after the oil has performed a lubricating function or to prevent the oil from reaching areas where oil is a contaminant. Oil slingers have been employed to prevent this undesirable migration and they basically function by providing a radially extending flow path for the oil so that the oil is discharged from the radially extending surface by centrifugal force. While such a slinger serves the intended purpose, its presence can interfere with access to the seals and/or bearings and can require extensive dismantling of the apparatus to replace the seals.

SUMMARY OF THE INVENTION

The present invention overcomes the problem of limited access associated with the use of a slinger in inaccessible locations by using an O-ring as both a seal and a detent. The slinger can be readily moved into and out of place against the detent action provided by the O-ring when the shaft is at rest. However, when the shaft is rotating, centrifugal force acts on the O-ring to deform it radially outward to provide a considerably greater holding force than the at rest detent action as well as to provide a fluid seal. Thus, when the shaft is at rest, the slinger can be readily moved and access can be readily had to the seals.

It is an object of this invention to provide a method and apparatus for mounting, seating, locating and locking an oil slinger.

It is another object of this invention to provide an O-ring which serves as both a detent and a static seal under dynamic forces.

It is a further object of this invention to provide a readily displaceable slinger. These objects, and others as will become apparent hereinafter, are accomplished by the present invention.

Basically, the present invention provides an oil slinger which is readily moved into and out of place against the detent action of an O-ring when the shaft to which the O-ring is secured is at rest. However when the shaft is rotating, the O-ring acts as a static seal and prevents movement of the slinger. Because the slinger is readily movable, access can be had to seals by moving the slinger aside.

BRIEF DESCRIPTIONS OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
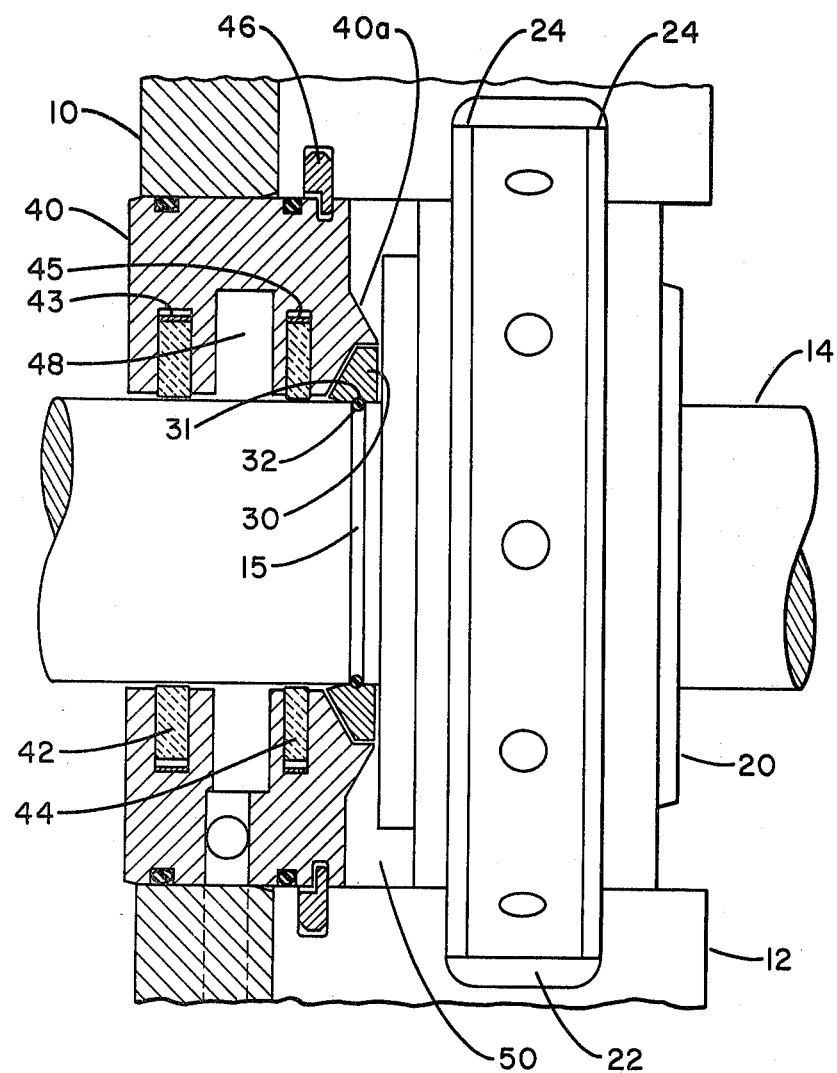
FIG. 1 is a partial sectional view of a portion of a compressor employing the slinger of the present invention.

In FIG. 1, the numeral 10 designates the backplate of a compressor which is secured to a gear casing 12. The drive shaft 14 serially extends from a pinion gear (not illustrated) through bearing 20, slinger 30 and air/oil seal housing 40 to the impeller of the compressor (not illustrated). Bearing 20 is a combination split, thrust and journal bearing and is lubricated by oil pumped into annulus 22 by an oil pump (not illustrated). The bearing 20 is held in position in gear casing 12 by shim pads 24 which are located in annulus 22 between the bearing 20 and the gear casing 12. The oil slinger 30 is held in place on shaft 14 by O-ring 32 which is received in groove 15 of shaft 14 and extends into annular recess 31 on slinger 30 where it serves as a detent, as will be explained in detail later.

The air/oil seal housing 40 is of split construction and contains two carbon seals, the air side seal 42 and the oil side seal 44. Carbon seals 42 and 44 are of split construction and are held together by the biasing action of wave springs 43 and 45, respectively. The air/oil seal housing 40 is held in place by split retaining ring 46 and has an annulus 48 which is connected to a source of air pressure (not illustrated) which serves a seal function for seals 42 and 44 by reducing or eliminating the pressure differentials across the seals.

Figure 4:
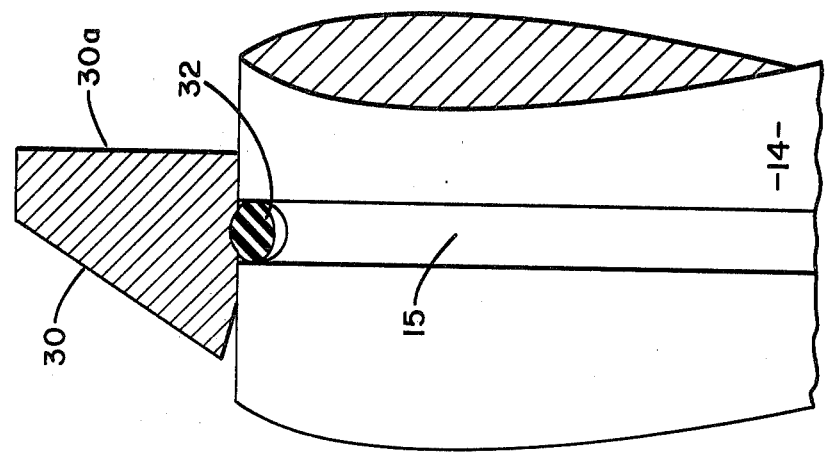
FIG. 4 is a partial sectional view showing the slinger in its operating position.

In the operating condition, shaft 14, O-ring 32 and slinger 30 will rotate as a unit. As best seen in FIG. 4, centrifugal force acting on O-ring 32 in the operating condition causes its outward movement to hold slinger 30 in place and to provide a static seal for preventing oil migration along the shaft 14. Specifically, some of the oil supplied to annulus 22 to lubricate bearing 20 tends to migrate along the shaft 14. Oil flowing toward slinger 30 is stopped by O-ring 32 when acting as a static seal. The oil then flows radially outward along face 30a of the slinger 30 to the collector 40a formed on seal housing 40 into annulus 50 which is connected to an oil sump or drain (not illustrated). Additional sealing takes place due to the supplying of pressurized seal air which tends to prevent air from entering annulus 48 by going past air side seal 42 and to prevent oil from entering annulus 48 by going past oil side seal 44. The above described coaction of the slinger with the bearing 20 and seals 42 and 44 is essentially conventional.

Figure 3:
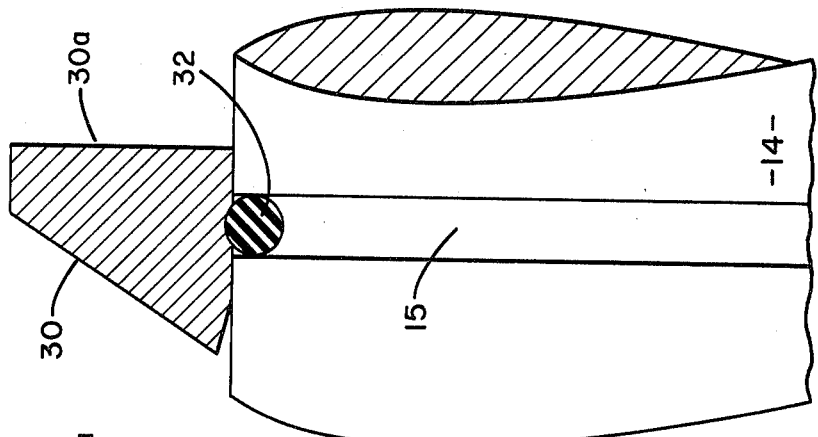
FIG. 3 is a partial sectional view showing the slinger held in place by detent action of the O-ring.
Figure 2:
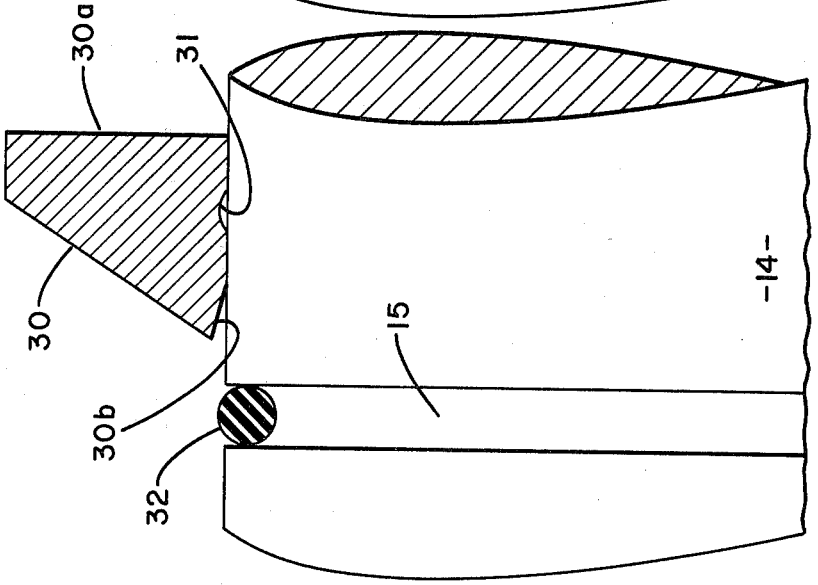
FIG. 2 is a partial sectional view showing the slinger in its withdrawn or service position.

As is best shown in FIGS. 2 and 3, the slinger 30 is readily moved into and out of position against the detent actin of O-ring 32. A chamfer 30b on the leading edge of tfhe slinger 30 assists the slinger in passing over the O-ring 32 so that the O-ring may be received in annular recess 31 in a detent relationship. In comparing the position of O-ring 32 in the at rest position of FIG. 3 and the static sealing position under dynamic forces of FIG. 4, the difference in the retaining force of the O-ring is evident from the distortion of the cross section of the O-ring.

The easy movement of the slinger 30 becomes important in replacing of seals 42 and 44 which are of the restrictive type and must be periodically replaced. The gear casing 12 would be unbolted or otherwise disassembled into two halves with the lower half corresponding to the structure of FIG. 1. With the structure exposed as shown in FIG. 1, the split bearing 20 can be removed in a conventional manner by rotating the bearing 20, removing the bolts (not illustrated) holding the sections together and removing the sections from the gear casing 12. At this point a slinger would ordinarily present problems because it is not of split construction and could not be removed without greater disassembly. Because slinger 30 is held in place only by the detent action of O-ring 32 it can be moved from the FIG. 3 to the FIG. 2 position since that space will be emptied by the removal of bearing 20. The split retaining ring 46 will then be removed which permits the movement of split seal housing 40 into the space vacated by the movement of slinger 30 to the FIG. 2 position. The O-ring 32 will provide a minimal resistance to the movement of seal housing 40 if left in place, but it is preferably moved aside. Split seal housing 40 will then be disassembled. The split carbon seals 42 and 44 can then be removed and replaced and the structure reassembled by reversing the disassembly process.

Although a preferred embodiment of the present invention has been illustrated and described, other changes will occur to those skilled in the art. For example, the present invention is adaptable to bearing replacement as well as seal replacement. It is therefore intended that the scope of the present invention is to be limited only by the scope of the appended claims.

What is claimed is:

1. An oil slinger comprising:
    an annular member;
    a first cylindrical surface formed on said annular member and having an annular groove formed therein;
    a second cylindrical surface formed on said annular member radially outward of said first cylindrical surface;
    a radial surface extending between said first and second cylindrical surfaces and defining a radial flowpath for oil contacting said annular member
    a generally radially extending surface between said first and second cylindrical surfaces;
    whereby when said slinger is mounted on a shaft having an O-ring extending above the surface of the shaft, the slinger can be readily moved into and out of position on the shaft by the O-ring coacting with said annular groove in a detent action.

2. The oil slinger of claim 1 wherein said generally radially extending surface is connected to said first cylindrical surface by a chamfer.

3. A method for removably mounting an oil slinger on a rotatable shaft including the steps of
    moving an annular oil slinger along a shaft until an O-ring is encountered;
    forcing the slinger over the O-ring;
    receiving the O-ring is a recess in the slinger in a detent action; and
    rotating the shaft whereby the O-ring forms a fluid seal with the slinger so that oil migrating along the shaft is forced to travel onto said slinger and is discharged therefrom by centrifugal force.

4. The method of claim 3 further including the step of moving said slinger off of the O-ring in a detent action whereby access can be had to the space occupied by the slinger when on the O-ring.

* * * * *